(12) United States Patent
Yamaguchi et al.

(10) Patent No.: US 9,762,116 B2
(45) Date of Patent: Sep. 12, 2017

(54) VOLTAGE CONVERSION APPARATUS

(71) Applicants: Takashi Yamaguchi, Aichi (JP); Akihiro Kinoshita, Aichi (JP); Shinji Horio, Aichi (JP)

(72) Inventors: Takashi Yamaguchi, Aichi (JP); Akihiro Kinoshita, Aichi (JP); Shinji Horio, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/041,515

(22) Filed: Feb. 11, 2016

(65) Prior Publication Data
US 2016/0268902 A1 Sep. 15, 2016

(30) Foreign Application Priority Data
Mar. 9, 2015 (JP) ................. 2015-045983

(51) Int. Cl.
*H02M 1/32* (2007.01)
*H02M 3/156* (2006.01)
*H02M 1/00* (2006.01)

(52) U.S. Cl.
CPC ............ *H02M 1/32* (2013.01); *H02M 3/156* (2013.01); *H02M 2001/0048* (2013.01); *Y02B 70/1491* (2013.01)

(58) Field of Classification Search
CPC .......... H02M 1/32; H02M 1/36; H02M 3/155; H02M 3/156; H02M 3/158; H02M 2001/0048
See application file for complete search history.

(56) References Cited

U.S. PATENT DOCUMENTS

| 5,584,974 A | * | 12/1996 | Sellers | H01J 37/3444 204/192.12 |
| 5,675,239 A | * | 10/1997 | Kim | G05F 1/613 323/273 |
| 7,015,748 B2 | * | 3/2006 | Wecht | H02J 9/061 327/538 |
| 2016/0071641 A1 | * | 3/2016 | Olausson | H01F 7/1816 134/18 |

FOREIGN PATENT DOCUMENTS

| JP | 2010-029009 A | 2/2010 |
| JP | 2012-253949 A | 12/2012 |
| JP | 2014-013865 A | 1/2014 |

\* cited by examiner

*Primary Examiner* — Matthew Nguyen
(74) *Attorney, Agent, or Firm* — Osha Liang LLP

(57) ABSTRACT

A voltage conversion apparatus includes a booster circuit, a boost stop circuit, a Zener diode, and a capacitor. The boost stop circuit includes a transistor. When an overvoltage equal to or larger than a breakdown voltage of the Zener diode is output to an output line of the booster circuit, the Zener diode is turned on. Accordingly, the transistor is turned on and a switching element is turned off to stop a boost operation. Further, the capacitor is charged through the Zener diode. Even when the Zener diode is turned off due to a drop in the output voltage after the stop of the boost operation, the transistor maintains its on state for a certain time by discharge of the capacitor. Thus, the stop of the boost operation is continued.

3 Claims, 9 Drawing Sheets

During non-boosting

VOLTAGE CONVERSION APPARATUS

CROSS-REFERENCE TO RELATED APPLICATION

This application is based on Japanese Patent Application No. 2015-045985 filed with the Japan Patent Office on Mar. 9, 2015, the entire contents of which are incorporated herein by reference.

FIELD

The disclosure relates to a voltage conversion apparatus that boosts an input voltage and supplies the boosted voltage to a load.

BACKGROUND

Some motor vehicles have a function of temporarily automatically stopping an engine, for example, when waiting for a traffic light and automatically restarting the engine when starting, that is, a so-called no idling function. In such motor vehicles, a large current flows through a starter motor at the time of restarting the engine. Thus, a battery voltage largely drops, and onboard equipment may not normally operate. Thus, in order to compensate the drop in the battery voltage, a voltage conversion apparatus such as a boost DC-DC converter is provided.

The boost voltage conversion apparatus is generally provided with a booster circuit which includes a switching element, an inductor, and a diode. The boost voltage conversion apparatus switches an input voltage at a high speed by the switching, element to output the boosted voltage. In the booster circuit, runaway of a CPU which controls on and off operations of the switching element may cause an abnormality in a boost operation and overvoltage may thereby be output. Thus, the onboard equipment which receives voltage supply from the booster circuit may be broken or destroyed by an overvoltage.

JP 2014-13565 A, JP 2012-255949 A, and JP 2010-29009 A describe techniques for preventing overvoltage input. In JP 2014-13865 A, in order to prevent an electric shock and breakage of an element in replacing an LED lamp, there is provided overvoltage prevention means for reducing an open voltage between a pair of terminals to a predetermined voltage or less when an LED array is removed from the terminals.

JP 2012-253949 A describes a DC-DC converter provided with a first switch which is connected to a coil in series, a second switch which is connected to the coil in parallel, a first controller which controls on and off operations of the first switch based on an output voltage, and a second controller which interrupts the control of the first controller and controls on and off operations of the second switch when the output voltage rises to a predetermined value. The second controller includes a first comparator having a first hysteresis characteristic for the output voltage of the DC-DC converter and a second comparator having a second hysteresis characteristic for the output voltage of the DC-DC converter. Each of the comparators has upper and lower limit thresholds and outputs an H level signal or an L level signal based on a result of comparison between the output voltage of the DC-DC converter and the thresholds.

JP 2010-29009 A describes a power supply circuit provided with an oscillation circuit, a charge pump circuit, a reference voltage generation circuit, and an overvoltage protection circuit. The overvoltage protection circuit generates a proportional voltage which is proportional to an output voltage. When the proportional voltage becomes a reference voltage or larger, the overvoltage protection circuit determines that the output voltage has become an overvoltage and stops a boost operation of the charge pump circuit. The overvoltage protection circuit is provided with a comparator, a resistor, a capacitor, and an AND circuit. When the comparator performs voltage comparison between the reference voltage and the proportional voltage, a predetermined hysteresis is provided by the resistor, the capacitor, and the AND circuit.

When a hysteresis for the output voltage is provided as performed in JP 2012-253949 A and JP 2010-29009 A, it is possible to keep an average value of the output voltage within a rated value range. However, in JP 2012-253949 A and JP 2010-29009 A, a circuit configuration becomes complicated due to the comparator used for achieving the hysteresis.

SUMMARY

One or more embodiments of the disclosure provide a voltage conversion apparatus capable of preventing output of an overvoltage with a simple circuit configuration.

A voltage conversion apparatus according to one or more embodiments of the disclosure includes a booster circuit including a switching element, the booster circuit configured to boost an input voltage by turning on and off the switching element; a Zener diode having a cathode connected to an output line of the booster circuit; a capacitor connected between an anode of the Zener diode and a ground; and a boost stop circuit configured to turn off the switching element to stop a boost operation in response to turning on of the Zener diode when an overvoltage equal to or larger than a breakdown voltage of the Zener diode is output to the output line of the booster circuit.

In such a configuration, when the output voltage becomes an overvoltage and reaches the breakdown voltage of the Zener diode, the Zener diode is turned on. Accordingly, the boost stop circuit operates to stop the boost operation, and the capacitor is charged through the Zener diode. Further, even when the Zener diode is turned off due to a drop in the output voltage caused by the stop of the boost operation, the boost stop circuit continuously operates by discharge of the capacitor. Thus, during this period, the switching element does not operate and the stop of the boost operation is continued. That is, it is possible to give a hysteresis to the operation of the switching element for the output voltage. As a result, a stop period of the boost operation is increased. Since the output voltage drops by a considerable amount from the overvoltage during the stop period, it is possible to keep the average value of the output voltage within a rated value range. Further, since the capacitor is used as means for achieving the hysteresis, the circuit configuration is simpler than a circuit configuration that uses a comparator as in JP 2012-253949 A and JP 2010-29009 A.

In one or more embodiments of the disclosure, the switching element may include an FET, and the boost stop circuit may include a transistor connected between a gate of the FET and the ground. In this case, when the overvoltage is output to the output line of the booster circuit, the transistor is turned on and the FET is turned off to stop a boost operation in response to turning on of the Zener diode and the capacitor is charged through the Zener diode. When the Zener diode is turned off after the stop of the boost operation, the transistor maintains the on state for a certain time by discharge of the capacitor.

One or more embodiments of the disclosure makes it possible to provide a voltage conversion apparatus capable of preventing output of an overvoltage with a simple circuit configuration.

DETAILED DESCRIPTION

Figure 1:
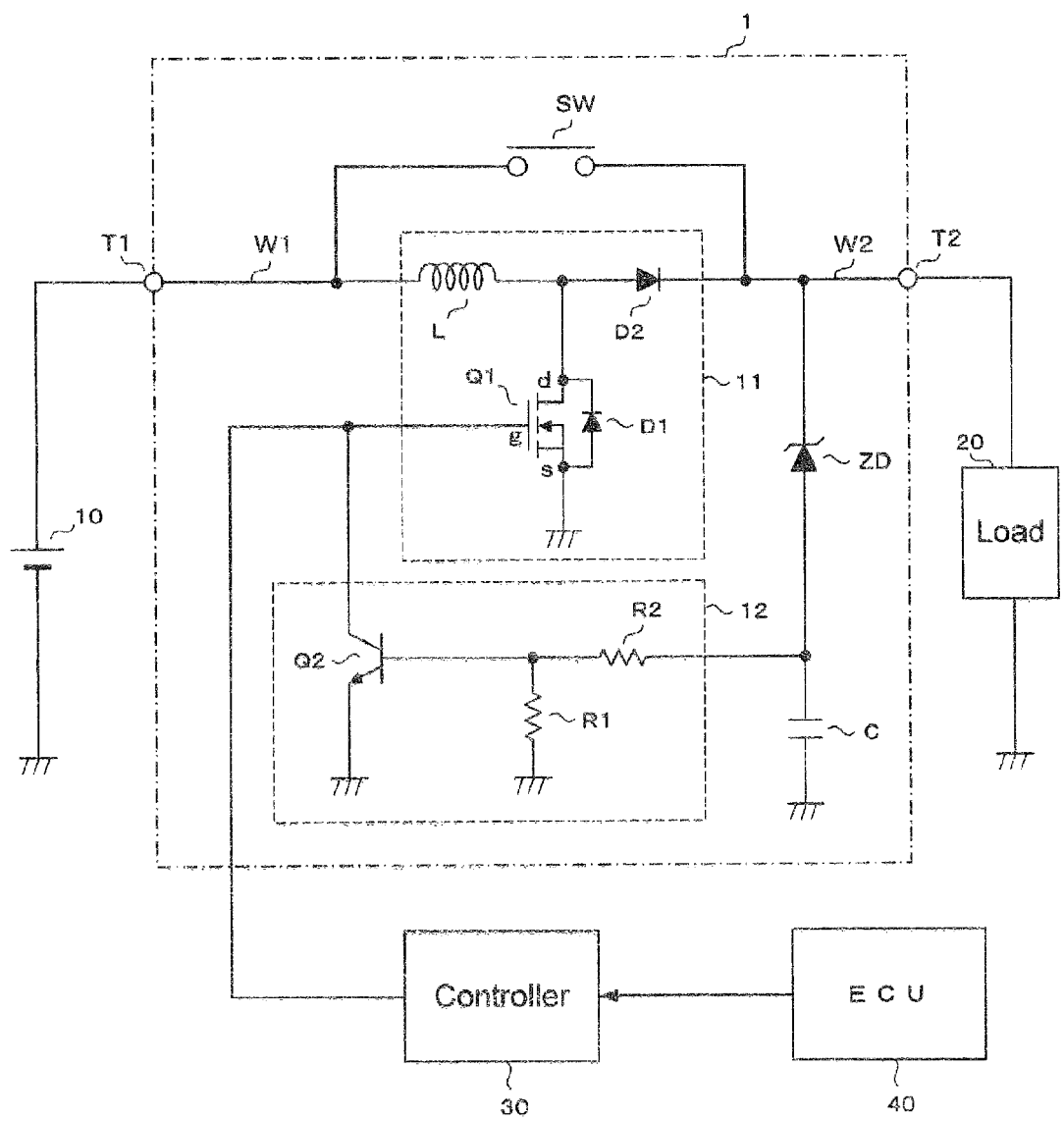
FIG. 1 is a circuit diagram of a voltage conversion apparatus according to one or more embodiments of the disclosure.

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the disclosure.

First, the configuration of a voltage conversion apparatus according to one or more embodiments of the disclosure will be described with reference to FIG. 1. The voltage conversion apparatus 1 is a boost DC-DC converter and disposed between a battery 10 and a load 20. In one or more embodiments of the disclosure, the battery 10 is a DC power supply mounted on a motor vehicle. The load 20 is onboard equipment including a car navigation device and an audio device.

The voltage conversion apparatus 1 is provided with a booster circuit 11, a boost stop circuit 12, a switch SW, a Zener diode ZD, a capacitor C, an input terminal T1, and an output terminal T2.

The booster circuit 11 is a known circuit that includes a switching element Q1, an inductor L, and a diode D2. One end of the inductor L is connected to the input terminal T1 through an input line W1. The other end of the inductor L is connected to an anode of the diode D2. A cathode of the diode D2 is connected to the output terminal T2 through an output line W2. The switching element Q1 includes a field effect transistor (FET). In the following description, the switching element Q1 is referred to as the FET Q1. A drain d of the FET Q1 is connected to a connection point between the inductor L and the diode D2. A source s of the FET Q1 is connected to the ground. The diode D1 is connected between the drain d and the source s in a direction opposite to the polarity of the battery 10. The diode D1 is a parasitic diode of the FET. A gate g of the FET Q1 is connected to a controller 30.

The boost stop circuit 12 includes a transistor Q2, a resistor R1, and a resistor R2. The transistor Q2 is connected between the gate g of the FET Q1 and the ground. Specifically, a collector of the transistor Q2 is connected to the gate g of the FET Q1. An emitter of the transistor Q2 is connected to the ground. A base of the transistor Q2 is connected to the ground through the resistor R1 and also connected to an anode of the Zener diode ZD through the resistor R2.

The switch SW includes, for example, a relay contact. The switch SW is connected to the booster circuit 11 in parallel. Thus, the switch SW forms a bypass circuit for the booster circuit 11. One end of the switch SW is connected to the input line W1. The other end of the switch SW is connected to the output line W2. The controller 30 controls on and off operations of the switch SW (wiring is omitted).

A cathode of the Zener diode ZD is connected to the output line W2. The anode of the Zener diode ZD is connected to one end of the capacitor C. The other end of the capacitor C is connected to the ground. Thus, the capacitor C is connected between the anode of the Zener diode ZD and the ground. The Zener diode ZD and the capacitor C are connected in series between the output line W2 and the ground. A connection point between the Zener diode ZD and the capacitor C is connected to the base of the transistor Q2 through the resistor R2.

A positive electrode of the battery 10 is connected to the input terminal T1. The input terminal T1 is connected to an input side of the booster circuit 11 through the input line W1. The load 20 is connected to the output terminal T2. The output terminal T2 is connected to an output side of the booster circuit 11 through the output line W2.

The controller 30 includes a CPU and a pulse width modulation (PWM) signal generation circuit. An external electronic control unit (ECU) 40 applies a boost request signal to the controller 30 at the time of restarting an engine after the finish of no idling. In addition to the boost request signal, various kinds of signals are input and output to the controller 30. However, since these signals are not directly related to one or more embodiments of the disclosure, signal lines of these signals are not illustrated (the same applies to FIGS. 2 to 9).

Next, the operation of the voltage conversion apparatus 1 will be described with reference to FIGS. 2 to 6.

Figure 2:
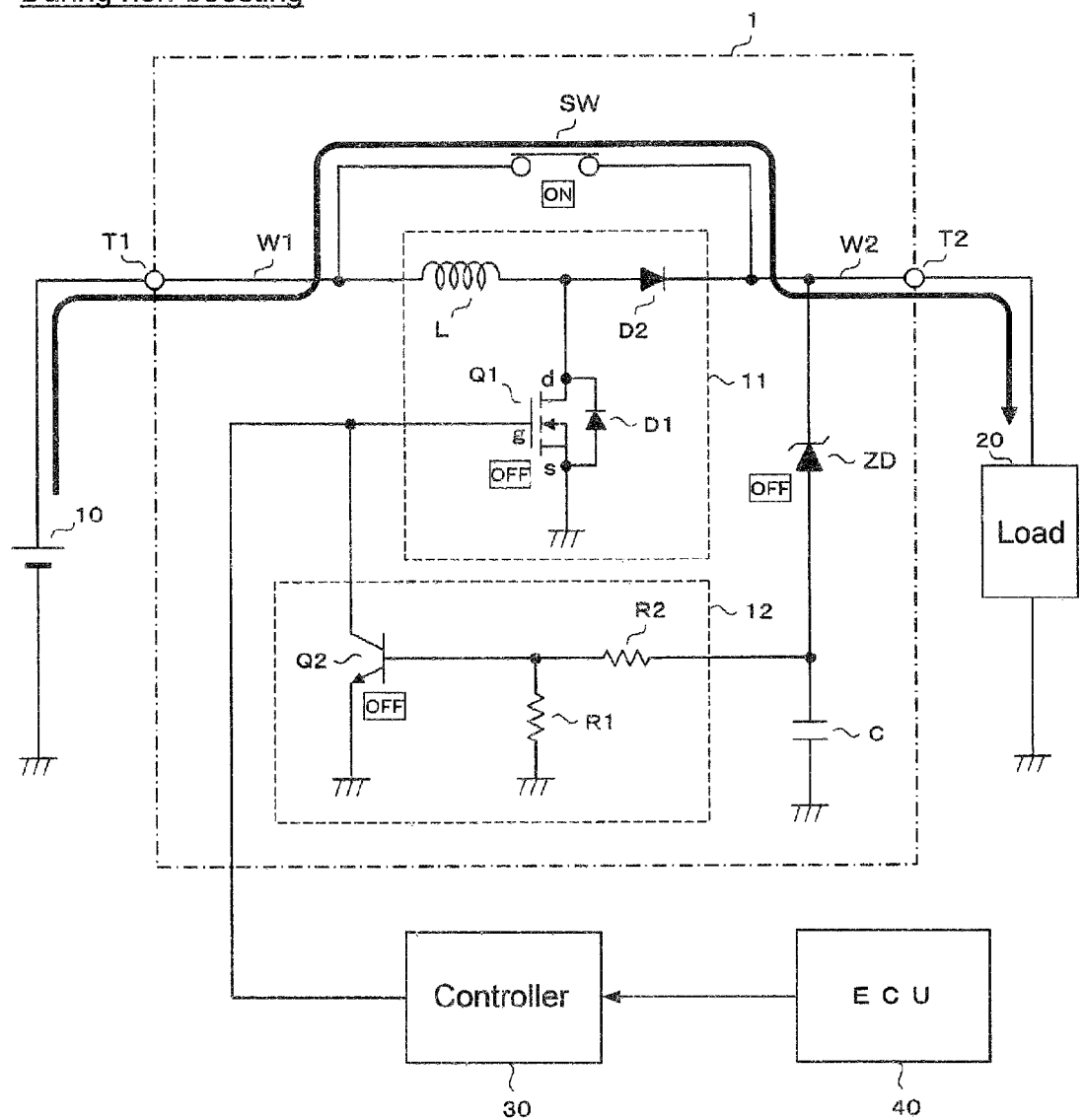
FIG. 2 is a circuit diagram illustrating a state during non-boosting.

When the ECU 40 applies no boost request signal to the controller 30, the controller 30 turns on the switch SW as illustrated in FIG. 2. Since the controller 30 outputs no PWM signal to the gate g of the FET Q1, the FET Q1 is in an off state. Thus, the booster circuit 11 is in an non-operating state and thus performs no boost operation. The Zener diode ZD and the transistor Q2 are also in an off state. Turning on the switch SW forms a current path leading from the battery 10 to the load 20 through the bypass circuit of the switch SW as indicated by a thick arrow in FIG. 2 so that a DC voltage of the battery 10 is supplied to the load 20 without through the booster circuit 11.

Figure 3:
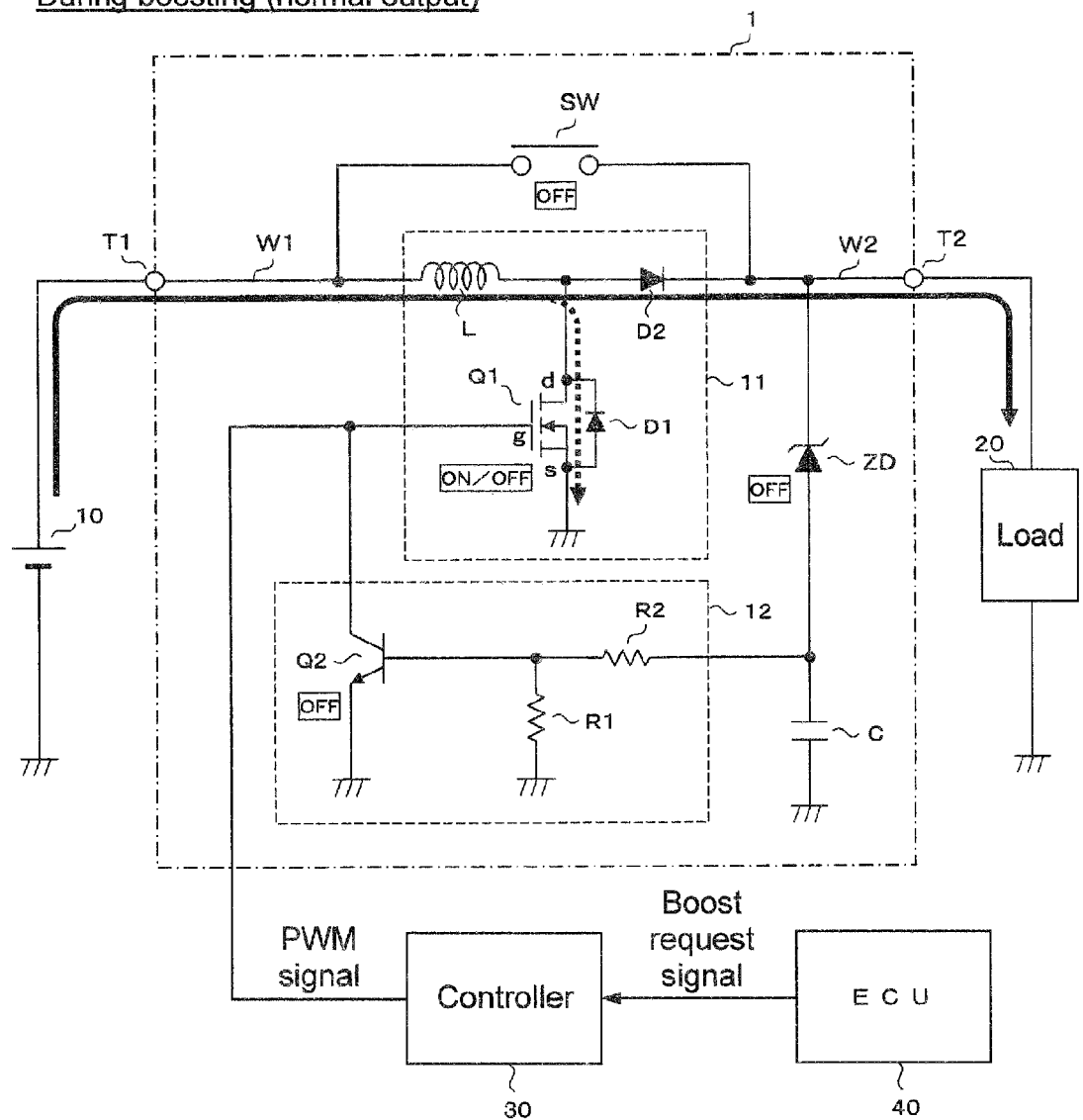
FIG. 3 is a circuit diagram illustrating a state during boosting (in normal output)

When the ECU 40 applies a boost request signal to the controller 30 at the time of restarting the engine after the finish of no idling, the circuit transitions to a state of FIG. 3. FIG. 3 illustrates a case in which a boost operation is normally performed. Upon receiving the boost request signal from the ECU 40, the controller 30 turns off the switch SW and outputs a PWM signal to the gate g of the FET Q1. Accordingly, the FET Q1 performs an on/off switching operation. In a period during which the FET Q1 is in an on state (an H level section of the PWM signal), a current indicated by a broken thick arrow flows through the FET Q1 and electric energy is accumulated on the inductor L. In a period during which the FET Q1 is in an off state (an L level section of the PWM signal), a high voltage that is generated by release of the electric energy accumulated on the inductor L is rectified by the diode D2 to form a boosted DC voltage and the boosted DC voltage is output to the output terminal T2. A current path at this time is as indicated by a solid thick arrow. In this manner, in the booster circuit 11, the boost operation is performed by the switching operation of the FET Q1, and the boosted DC voltage is supplied from the output terminal T2 to the load 20.

Figure 4:
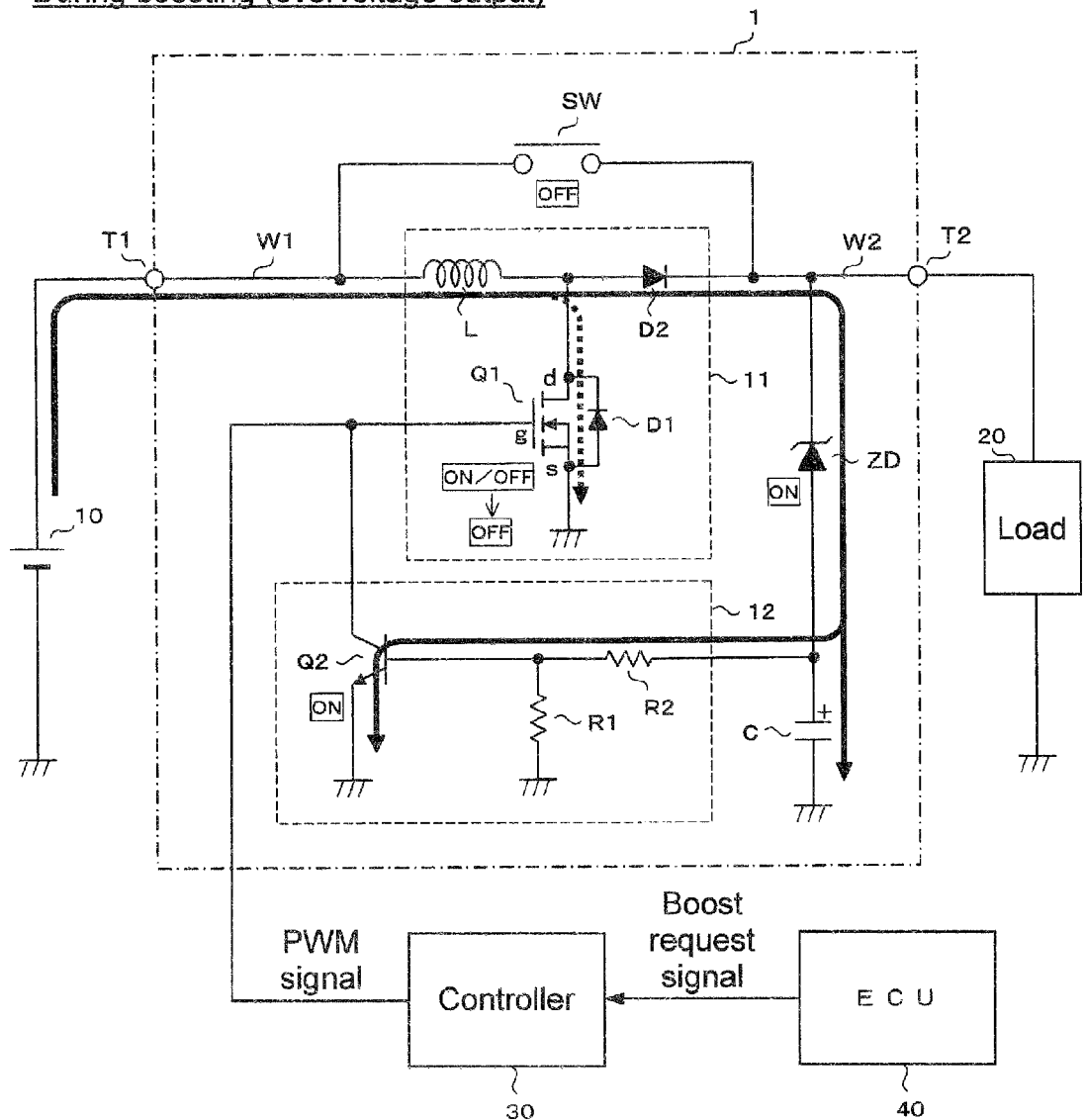
FIG. 4 is a circuit diagram illustrating a state during boosting (in overvoltage output)

FIG. 4 illustrates a circuit state when a voltage output from the booster circuit 11 is an overvoltage. Such an overvoltage may be output, for example, when the CPU of the controller 30 runs away and the duty of a PWM signal output from the controller 30 is thereby increased. When an overvoltage is output from the booster circuit 11 to the output line W2 and the overvoltage is equal to or larger than a breakdown voltage of the Zener diode ZD, the Zener diode ZD is turned on. Thus, as indicated by a solid thick arrow, a current flows from the battery 10 to the base of the transistor Q2 through the inductor L, the diode D2, the Zener diode ZD, and the resistor R2 to turn on the transistor Q2. The current passing through the Zener diode ZD also flows to the capacitor C to charge the capacitor C.

When the transistor Q2 is turned on, the gate g of the FET Q1 is grounded through the transistor Q2. Thus, a PWM signal output from the controller 30 is introduced into the ground and not applied to the gate g of the FET Q1. As a result, the FET Q1 stops the on/off switching operation and transitions to an off state.

Figure 5:
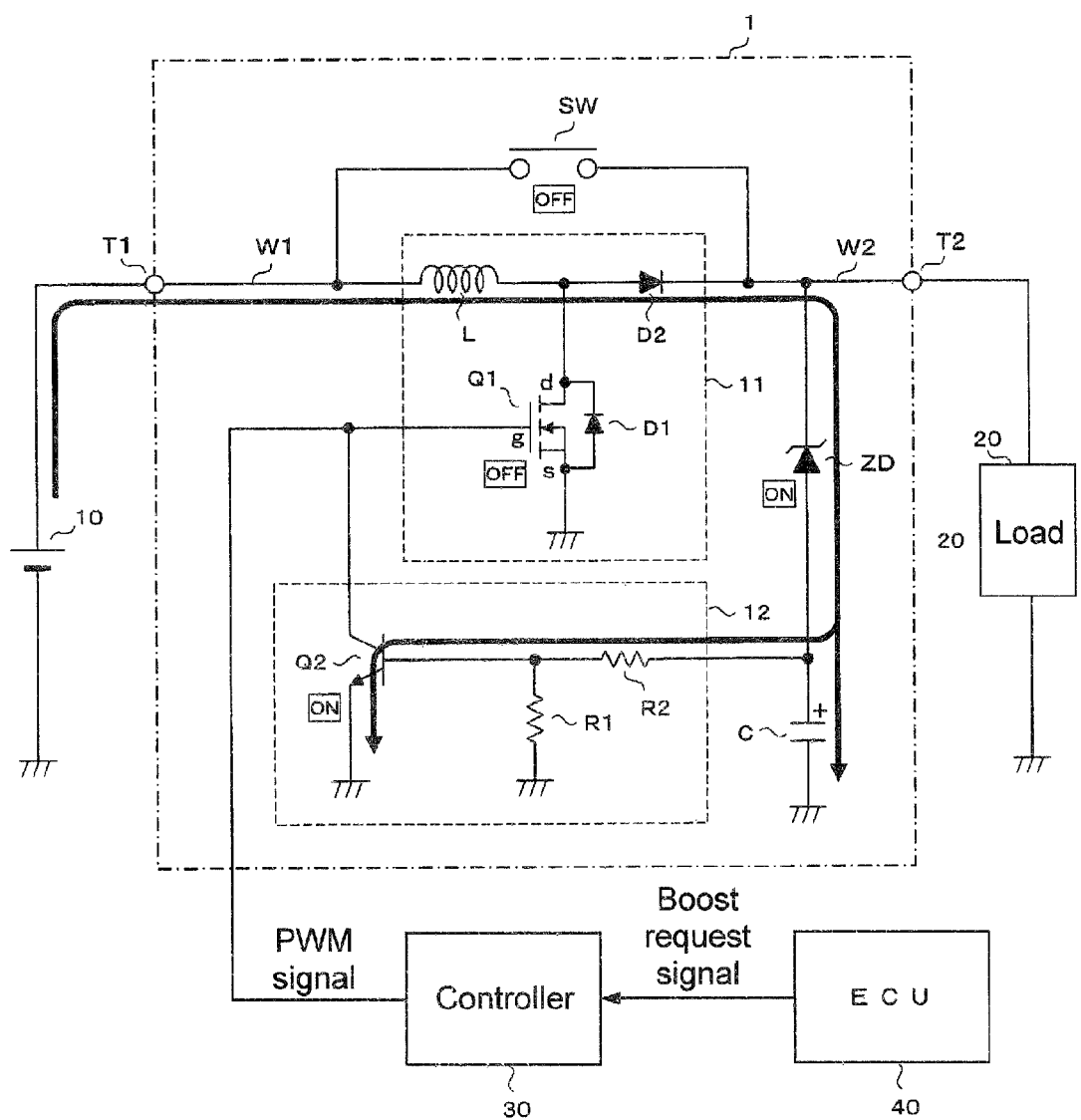
FIG. 5 is a circuit diagram illustrating a state transitioned from the state of FIG. 4.

FIG. 5 illustrates a circuit state after the FET Q1 is turned off. When the FET Q1 is turned off, the booster circuit 11 stops the boost operation. However, when the voltage of the output line W2 is equal to or larger than the breakdown voltage of the Zener diode ZD, the Zener diode ZD maintains its on state. Thus, a current path indicated by a thick arrow is maintained. Therefore, the transistor Q2 is in an on state, and charge to the capacitor C is continued.

When the operation of the booster circuit 11 is stopped, the voltage of the output line W2 gradually drops. Thus, when a certain time has passed after the stop of the boost operation, the voltage of the output line W2 becomes less than the breakdown voltage of the Zener diode ZD to turn off the Zener diode ZD. Accordingly, the circuit transitions to a state illustrated in FIG. 6.

Figure 6:
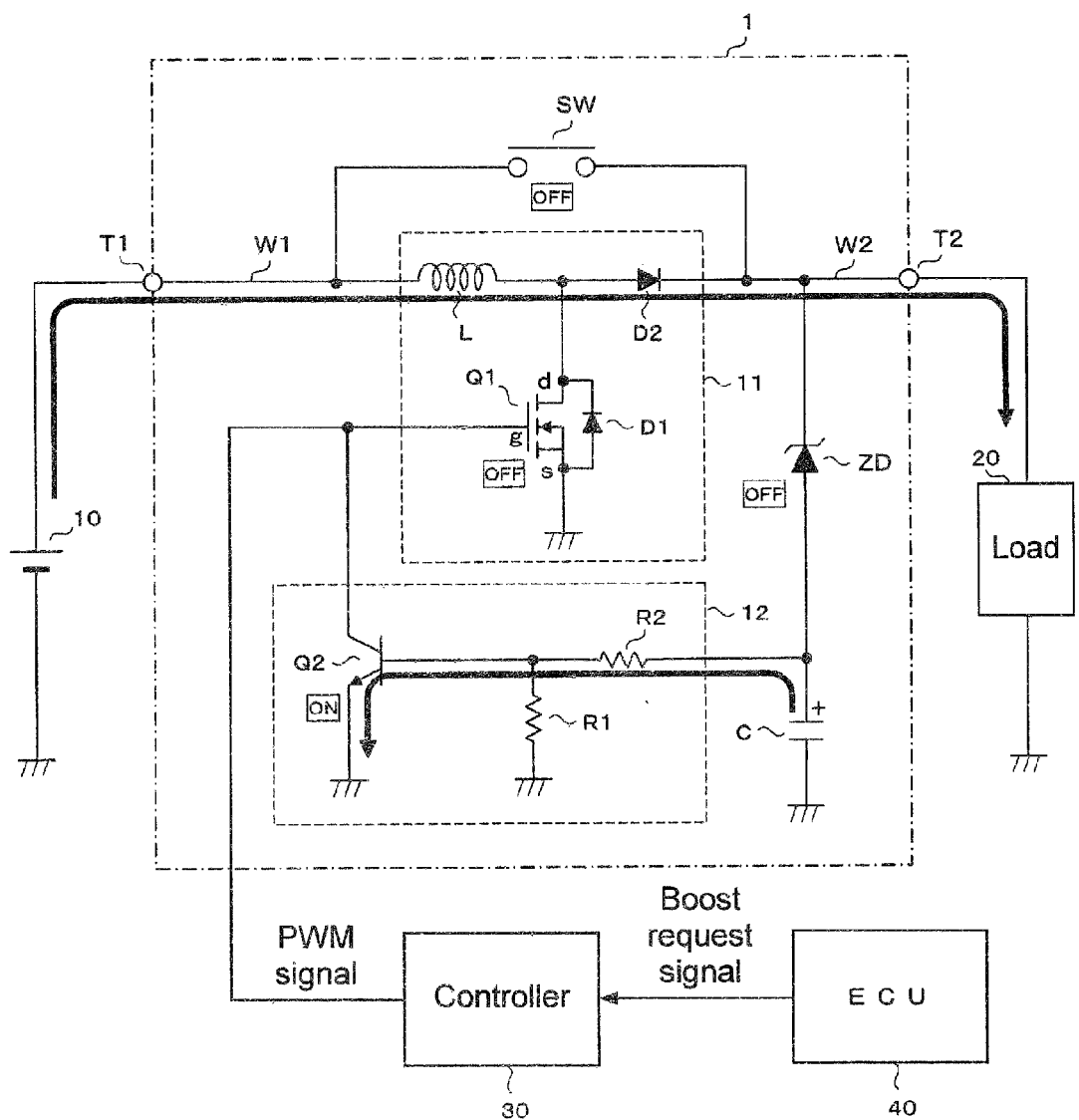
FIG. 6 is a circuit diagram illustrating a state transitioned from the state of FIG. 5.

In FIG. 6, since the Zener diode ZD is in an off state, a current flows from the battery 10 to the load 20 through the inductor L and the diode D2 as indicated by a thick arrow. Further, the charge on the capacitor C is discharged, and a current flows from the capacitor C to the base of the transistor Q2 through the resistor R2. Thus, the transistor Q2 continuously maintains its on state. Accordingly, the gate g of the FET Q1 remains grounded through the transistor Q2, and no PWM signal is applied to the gate of the FET Q1. As a result, the FET Q1 performs no switching operation. Thus, a boost stop state of the booster circuit 11 is maintained.

In this manner, also after the Zener diode ZD is turned off, the transistor Q2 maintains its on state by the discharge of the capacitor C to inhibit the boost operation of the booster circuit 11. This state is continued until the voltage across the capacitor C drops to a predetermined value (an on-threshold of the transistor Q2). Thus, during this period, the voltage of the output line W2 considerably drops from the initial overvoltage. Therefore, the load 20 can be reliably protected from the overvoltage.

When the capacitor C is discharged and the voltage across the capacitor C drops to the predetermined value, no current flows to the base of the transistor Q2 and the transistor Q2 is turned off. Accordingly, the circuit becomes the state illustrated in FIG. 3 so that a PWM signal from the controller 30 is applied to the gate g of the FET Q1 and the FET Q1 performs a switching operation. Thus, the booster circuit 11 again starts the boost operation to supply the boosted voltage to the load 20. When an overvoltage is again output from the booster circuit 11 at the time of restarting the boost operation, the operations of FIGS. 4 to 6 are performed.

Figure 7:
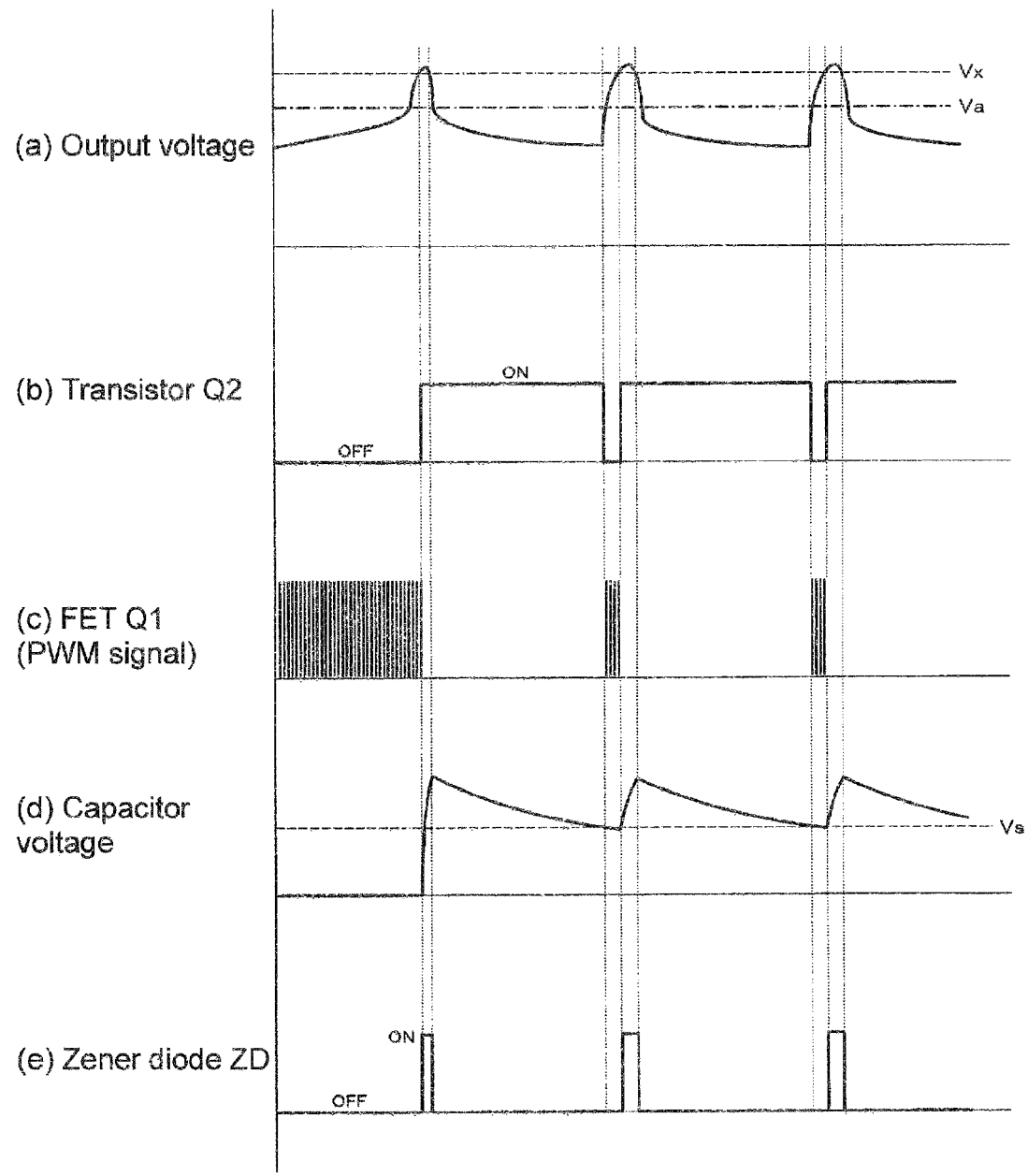
FIG. 7 is a time chart illustrating the operation of the voltage conversion apparatus of one or more embodiments of the disclosure.

FIG. 7 is a time chart illustrating the operation of the voltage conversion apparatus 1 when the overvoltage is output. In FIG. 7, (a) indicates the output voltage of the booster circuit 11, (b) indicates the operation of the transistor Q2, (c) indicates the operation (PWM signal) of the FET Q1, (d) indicates the voltage across the capacitor C, and (e) indicates the operation of the Zener diode ZD. In FIG. 7, Vx denotes the breakdown voltage of the Zener diode ZD, Va denotes an average value of the output voltage, and Vs denotes the on-threshold of the transistor Q2.

As shown in FIG. 7, when the output voltage becomes an overvoltage and reaches the breakdown voltage Vx, the Zener diode ZD is turned on and the transistor Q2 is also turned on. Accordingly, the switching operation of the FET Q1, that is, the boost operation is stopped. At this time, the capacitor C is charged through the Zener diode ZD. Even when the Zener diode ZD is turned off due to a drop in the output voltage caused by the stop of the boost operation, the transistor Q2 maintains its on state by the discharge of the capacitor C and the boost stop circuit 12 continuously operates, Thus, during this period, the FET Q1 performs no switching operation, so that the stop of the boost operation is continued.

In this manner, when the output voltage becomes an overvoltage, the FET Q1 immediately stops the switching operation. Then, even when the output voltage drops, the FET Q1 does not immediately restart the switching operation and maintains its off state for a certain time during which the capacitor C is discharged. That is, in the voltage conversion apparatus 1 in one or more embodiments of the disclosure, the capacitor C is used to give a hysteresis to the operation of the FET Q1 for the output voltage.

Figure 8:
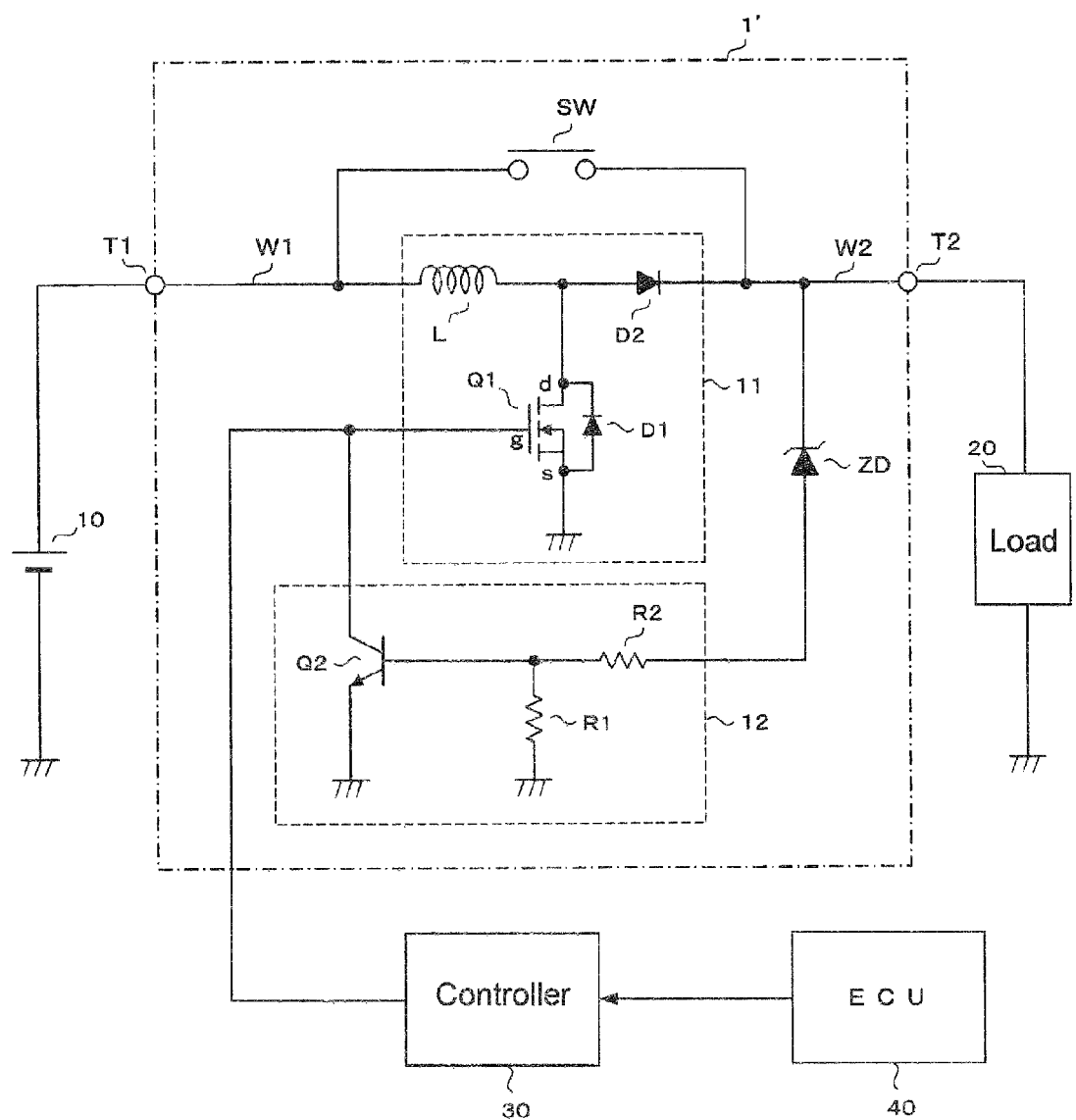
FIG. 8 is a circuit diagram of a conventional voltage conversion apparatus.
Figure 9:
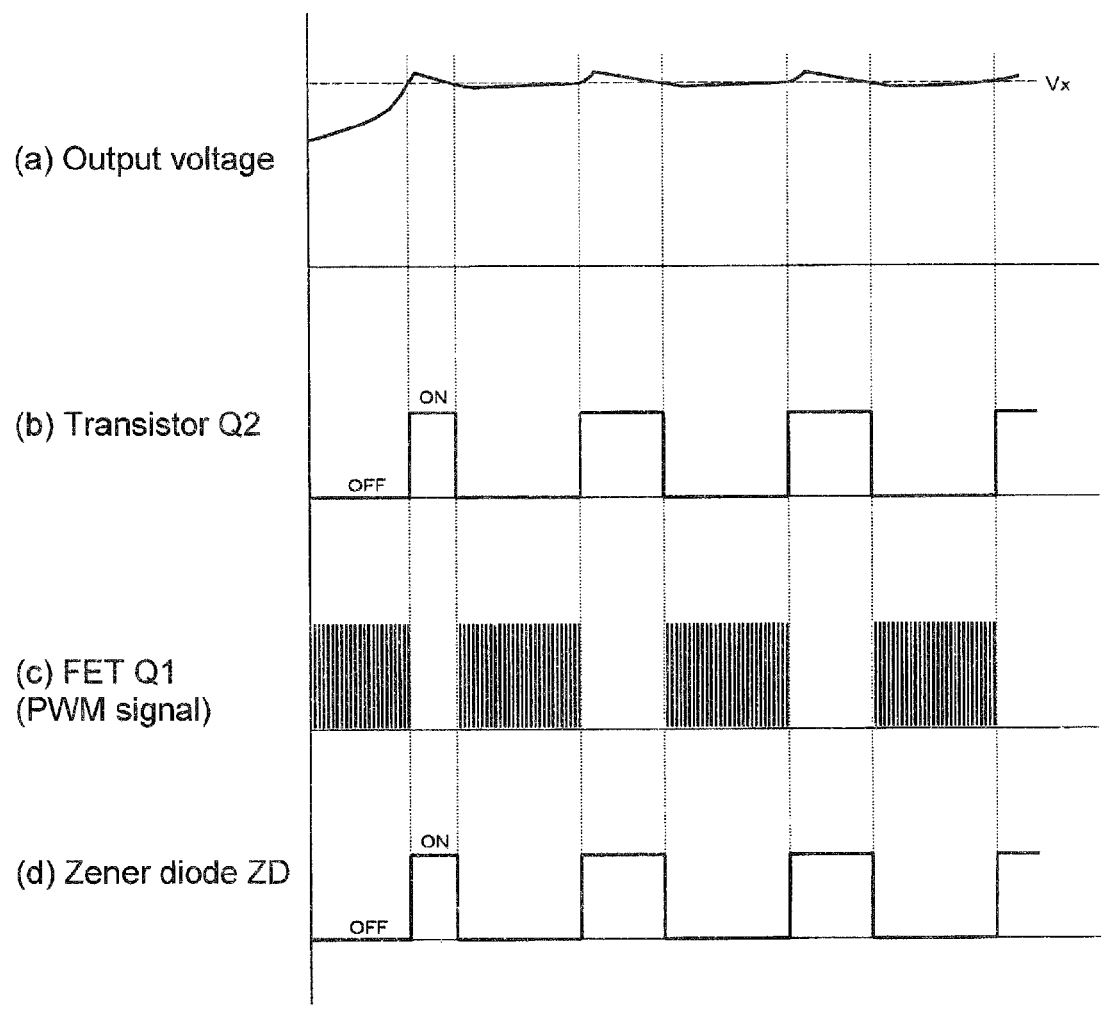
FIG. 9 is a time chart illustrating the operation of the conventional voltage conversion apparatus.

FIG. 8 illustrates a conventional voltage conversion apparatus 1' provided with no capacitor C. The circuit configuration other than the capacitor C is the same as the circuit configuration illustrated in FIG. 1. FIG. 9 is a time chart illustrating the operation of the voltage conversion apparatus 1' when an overvoltage is output. In FIG. 9, (a) indicates the output voltage of the booster circuit 11, (b) indicates the operation of the transistor Q2, (c) indicates the operation (PWM signal) of the FET Q1, and (d) indicates the operation of the Zener diode ZD. In FIG. 9, Vx denotes the breakdown voltage of the Zener diode ZD.

In FIG. 9, when the output voltage becomes an overvoltage and reaches the breakdown voltage Vx, the Zener diode ZD is turned on and the transistor Q2 is also turned on. Accordingly, the switching operation of the FET Q1, that is, the boost operation is stopped. This is the same as the disclosure. However, when the Zener diode ZD is turned off due to a drop in the output voltage caused by the stop of the boost operation, the transistor Q2 is also turned off. As a result, the FET Q1 immediately restarts the switching operation. Thus, the output voltage again rises. The above operation is repeatedly performed while the overvoltage output state is continued. As a result, a stop period of the boost operation is reduced, and the output voltage rises and drops around the breakdown voltage Vx. Thus, it is difficult to keep the average value of the output voltage within a rated value range.

On the other hand, in the voltage conversion apparatus 1 in one or more embodiments of the disclosure, even when the Zener diode ZD is turned off due to the stop of the boost operation, the FET Q1 does not immediately restart the switching operation due to the hysteresis by the discharge of the capacitor C. Thus, the stop period of the boost operation is increased. Accordingly, since the output voltage drops by a considerable amount from the overvoltage, it is possible to keep the average value of the output voltage within the rated value range.

The voltage conversion apparatus 1 in one or more embodiments of the disclosure does not use a comparator as used in JP 2012-253949 A and JP 2010-29009 A, but uses the capacitor C as means for giving a hysteresis to the operation of the FET Q1 for the output voltage. Thus, it is only required to add a single capacitor C to the conventional circuit (FIG. 8), which makes it possible to prevent the circuit configuration from becoming complicated as the configuration that uses a comparator.

The disclosure may employ various embodiments in addition to an illustrative embodiment. For example, although the controller 30 is provided separately from the voltage conversion apparatus 1 in an illustrative embodiment, the voltage conversion apparatus 1 may include the controller 30.

In an illustrative embodiment, the relay contact has been described as an example of the switch SW which constitutes the bypass circuit. However, the switch SW may be a semiconductor switching element such as an FET and a transistor.

In an illustrative embodiment, the FET Q1 is used as the switching element of the booster circuit 11. However, a transistor may be used instead of the FET.

In an illustrative embodiment, the transistor Q2 is used as the switching element of the boost stop circuit 12. However, an FET may be used instead of the transistor.

In an illustrative embodiment, the voltage conversion apparatus for compensating a drop in the battery voltage at the time of restarting the engine has been described as an example. However, the voltage conversion apparatus in one or more embodiments of the disclosure may also be used for compensating a drop in the battery voltage caused by a counter electromotive force during high-speed rotation of a motor in an electric motor vehicle.

In an illustrative embodiment, the voltage conversion apparatus mounted on a motor vehicle has been described as an example. However, the voltage conversion apparatus in one or more embodiments of the disclosure may also be applied to applications other than a motor vehicle.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. A voltage conversion apparatus comprising:
   a booster circuit comprising a switching element, the booster circuit configured to boost an input voltage by turning on and off the switching element;
   a Zener diode having a cathode connected to an output line of the booster circuit;
   a capacitor connected between an anode of the Zener diode and a ground; and
   a boost stop circuit configured to turn off the switching element to stop a boost operation in response to turning on of the Zener diode when an overvoltage equal to or larger than a breakdown voltage of the Zener diode is output to the output line of the booster circuit.
2. The voltage conversion apparatus according to claim 1, wherein the switching element comprises an FET,
   wherein the boost stop circuit comprises a transistor connected between a gate of the FET and the ground, and
   wherein the transistor is turned on when the Zener diode is turned on.
3. The voltage conversion apparatus according to claim 2, wherein when the overvoltage is output to the output line of the booster circuit, the transistor is turned on and the FET is turned off to stop a boost operation in response to turning on of the Zener diode and the capacitor is charged through the Zener diode, and
   wherein when the Zener diode is turned off after the stop of the boost operation, the transistor maintains the on state for a certain time by discharge of the capacitor.

* * * * *